(12) United States Patent
Sprenger (10) Patent No.: US 9,593,927 B2
(45) Date of Patent: *Mar. 14, 2017

(54) DYNAMICAL MONITORING AND MODELLING OF A COORDINATE MEASURING MACHINE

(71) Applicant: Hexagon Technology Center GmbH, Heerburgg (CH)

(72) Inventor: Bernhard Sprenger, Widnau (CH)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 492 days.

This patent is subject to a terminal disclaimer.

(21) Appl. No.: 14/172,752

(22) Filed: Feb. 4, 2014

(65) Prior Publication Data

US 2014/0249772 A1    Sep. 4, 2014

(30) Foreign Application Priority Data

Feb. 5, 2013   (EP) ..................................... 13153980

(51) Int. Cl.
*G01C 19/00*    (2013.01)
*G01B 5/008*    (2006.01)
*G01B 21/04*    (2006.01)

(52) U.S. Cl.
CPC ........... *G01B 5/008* (2013.01); *G01B 21/045* (2013.01); *G05B 2219/37193* (2013.01);
(Continued)

(58) Field of Classification Search
CPC ................. G01B 5/008; G01B 21/045; G05B 2219/37193; G05B 2219/41146; G05B 2219/49181

See application file for complete search history.

(56) References Cited

U.S. PATENT DOCUMENTS 5,610,846 A *  3/1997  Trapet .................. G01B 21/045
                                                   702/41
7,171,320 B2    1/2007  Ogura et al.
(Continued)

FOREIGN PATENT DOCUMENTS

CN    1651858 A    8/2005
CN    1856690 A    11/2006
(Continued)

OTHER PUBLICATIONS

European Search Report dated Apr. 18, 2013 received in Application No. EP 13 15 3980.
(Continued)

*Primary Examiner* — Elias Desta
(74) *Attorney, Agent, or Firm* — Maschoff Brennan (57) ABSTRACT

A method for providing dynamic state information for a coordinate measuring machine that includes a base, a probe head, a machine structure linking the probe head to the base and a drive mechanism that moves the probe head. A dynamic model with first state variables represents an actual state of physical properties of the coordinate measuring machine. The first state variables are provided in a database and the actual state of the coordinate measuring machine is determined using the dynamic model. The state variables are monitored and, based thereon, the change of the state variables is determined. Updated, second state variables are set regarding the determined change of the first state variables. The dynamic model is updated using the second state variables in place of the first state variables, wherein the actual state of the coordinate measuring machine is calculated based on the second state variables.

20 Claims, 3 Drawing Sheets

(52) U.S. Cl.
CPC ............... *G05B 2219/41146* (2013.01); *G05B 2219/49181* (2013.01); *Y02P 90/265* (2015.11)

(56) References Cited

U.S. PATENT DOCUMENTS

| | | |
|---|---|---|
| 7,533,574 B2 | 5/2009 | McMurtry et al. |
| 7,568,373 B2 | 8/2009 | McMurtry et al. |
| 8,001,859 B2 | 8/2011 | McMurtry et al. |
| 8,939,008 B2 | 1/2015 | McMurtry et al. |
| 2003/0079358 A1 | 5/2003 | Nai et al. |
| 2012/0246953 A1* | 10/2012 | Engel .................. G01B 21/047 33/502 |

FOREIGN PATENT DOCUMENTS

| | | |
|---|---|---|
| CN | 1882821 A | 12/2006 |
| CN | 102686974 A | 9/2012 |
| EP | 1 559 990 A2 | 8/2005 |
| EP | 1 687 589 B1 | 9/2012 |
| EP | 2762829 A1 | 8/2014 |
| GB | 2 425 840 A | 11/2006 |
| WO | 02/04883 A1 | 1/2002 |

OTHER PUBLICATIONS

Yang et al., "Dynamic error modeling of CMM based on Bayesian statistical principle" Proceedings of SPIE, vol. 7130, Dec. 31, 2008, pp. 71300H-71300H-7.

* cited by examiner fig.1 fig.2

DYNAMICAL MONITORING AND MODELLING OF A COORDINATE MEASURING MACHINE

FIELD OF THE INVENTION

The present invention generally pertains to a method for providing dynamic state information of a coordinate measuring machine and to a coordinate measuring machine being adapted for execution of such method.

BACKGROUND

It is common practice to inspect work pieces subsequent to production on a coordinate positioning apparatus, such as a coordinate measuring machine (CMM), in order to check for correctness of predefined object parameters, like dimensions and shape of the object.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probe) carried by the probe head.

In a simple form of the machine a suitable transducer mounted parallel to each axis is able to determine the position of the probe head relative to a base of the machine and, therefore, to determine the coordinates of a measurement point on the object being approached by the sensor. For providing movability of the probe head a typical coordinate measuring machine may comprise a frame structure on which the probe head is arranged and driving means for moving frame components of the frame structure relative to each other.

For measuring surface variations, both measurement principles based on use of tactile sensors and of optical sensors are known.

In general, to provide a coordinate measuring machine with an improved measurement precision, its frame structure is therefore usually designed to have a high static stiffness. In order to achieve a stiff and rigid machine design, the frame structure or at least parts of it, is often made of stone, such as granite. Besides all the positive effects like thermal stability and good damping properties, the granite also makes the machine and the movable frame elements quite heavy. The high weight on the other side also requires high forces for a decent acceleration.

There are still several possible sources of error, if such technique is employed. Resonances or vibrations of machine parts when moving one frame component relative to another component are just two examples for dynamic errors. Moreover, errors emerging from vibrations coming from outside the machine are to be considered. Additionally, static errors like lack of straightness in movement and of orthogonality of the axes or lateral offset in the linear drive mechanisms may occur.

According to many approaches the mentioned errors are only analyzed statically, although they also comprise dynamic factors which are dependent on the movement of the axes, in particular dependent on the position, speed, acceleration and jerk when moving the axis. With the speed-dependent calibration, this fact is taken into account in a rather simple and inflexible way. While the static errors can be numerically reduced by the use of position calibration matrices, things get much more complex when trying to compensate the dynamic errors.

The calibration gets even more complex when taking into account the dynamic errors, such as mentioned vibrations or resonance or dynamic forces etc. which errors can not only influence the axis on which they are occurring, but which can also "crosstalk" to other axes and cause errors in other parts of the system. Furthermore, the underlying effects can also be dependent on environmental conditions such as temperature, humidity, air-pressure, etc. and in particular, they will also vary over the lifetime of the machine.

In that context, for example, it has to be considered that accelerations of one axis of the machine (which can move further perpendicular axes and the probe head), can cause linear and angular dynamic deflections of the whole frame of the coordinate measuring machine, which in turn cause measurement uncertainties and errors. These dynamic measurement errors may be reduced by taking measurements at low accelerations, e.g. by a consequently optimized trajectory of desired movement.

Known approaches are trying to suppress deflections, vibrations and/or oscillations caused by the acceleration of the machine by a technology called input-shaping, which controls the regulating variable, e.g. the force or current of a propulsion motor, in such a way as to bypass mechanical resonances and avoid a stimulation of resonance frequencies or even actively counterforce oscillations by a accordingly manipulated variable on the output to the driving actuator control.

Also model predictive control, as a form of control in which the current control action is obtained by solving at each sampling instant a finite horizon open-loop optimal control problem, using the current state of the plant as the initial state, can be applied to CMMs. The optimisation yields an optimal control sequence and the first control in the sequence is then applied to the plant.

Exemplarily for error handling, EP 1 559 990 discloses a coordinate measuring system and method of correcting coordinates measured in a coordinate measuring machine, measuring geometrical errors while parts with various weights are mounted on the coordinate measuring machine. Compensation parameters are derived from measured results per a weight of a part and stored. A compensation parameter corresponding to a weight of a part to be measured is appropriately read out to correct measured coordinates of the part to be measured.

As a further example, EP 1 687 589 discloses a method of error compensation in a coordinate measuring machine with an articulating probe head having a surface detecting device. The surface detecting device is rotated about at least one axis of the articulating probe head during measurement. The method comprises the steps of: determining the stiffness of the whole or part of the apparatus, determining one or more factors which relate to the load applied by the articulating probe head at any particular instant and determining the measurement error at the surface sensing device caused by the load.

Another approach for error correction of work piece measurements with a coordinate measuring machine (CMM) is disclosed in GB 2 425 840. Thereby, position measurements are taken with a work piece sensing probe, in which means of measuring acceleration are provided. The measurements are corrected for both high frequency (unrepeatable) errors such as those due to vibration, and low frequency (repeatable) errors such as those due to centrifugal forces on the probe. The correction method comprises measuring the work piece, determining repeatable measurement errors from a predetermined error function, error map or error look-up table, measuring acceleration and calculating unrepeatable measurement errors, combining the first and second measurement errors to determine total errors and correcting the work piece measurements using the total errors. The predetermined error map is calculated using an artifact of known dimensions.

It is also known to use accelerometers fitted in the probe or on other moving parts of the measurement machine, e.g. the Z-column and/or in the base table, allowing a differential measurement and/or the evaluation of externally applied vibrations. In such an arrangement, the displacements and errors of the probe-position can be measured with double integration and, based on this information, it is possible to adjust the reading with the difference between the doubly integrated signal and the scales. For instance, such a quasi-static approach is disclosed by WO 02/04883.

For handling above mentioned errors, in particular dynamic errors, usually a suitable model of the CMM is to be defined, wherein a positioning behaviour of especially the frame structure of the CMM is enabled to be described based on that model. Exemplarily, a look-up table may be defined in order to lookup a correction value correlated with an actual positioning of the frame components of the CMM. Such modelling of a CMM becomes more important along with weight (and stiffness) reduction of CMM-parts.

Weight reduction is a main topic relating to the designs of coordinate measuring machines, as if the machine components are built comprising less weight (and less stiffness) faster positioning of respective components can be achieved by causing fewer force affecting the coordinate measuring machine. On the other hand the influence of machine vibrations and torsions caused by reduced stiffness and (faster) movement of the machine components increase with weight reduction of these parts. Thus, uncertainties of derived measurement values and errors occurring from such deformations and vibrations increase accordingly. Known modelling for providing error compensation of coordinate measuring machines does not enable to calculate and compensate for the increased amount of errors influencing the measuring performance of a CMM. Moreover, such modelling does not enable to handle or to determine different kinds of errors continuously with high precision in order to compensate measuring values derived with weight reduced CMMs.

SUMMARY

It is therefore an object of the present invention to provide an improved method for providing reliable calculation of a state of a CMM, in particular wherein the calculation of the state is provided continuously.

A further object of the present invention is to provide calculation of corrected position values from measured positions and derived error values for the positions.

Yet another object of the present invention is to provide an improved method for determining machine vibrations and/or deformations and, particularly, for compensation of errors cause by such vibrations and/or deformations.

The invention relates to a method for providing dynamic state information for at least a part of a coordinate measuring machine, the coordinate measuring machine comprising a base, a probe head, a machine structure with structural components for linking the probe head to the base and at least one drive mechanism for providing movability of the probe head relative to the base. Furthermore, a dynamic model is defined with a first set of state variables, the state variables being related to a set of physical properties of at least the part of the coordinate measuring machine and representing an actual state of at least the part of the coordinate measuring machine. The first set of state variables is provided in a database and the actual state of at least the part of the coordinate measuring machine is determined by a calculation based on the dynamic model.

According to the invention, a monitoring of at least one of the state variables and, based thereon, determining a change of at least one of the state variables, are performed, wherein a second set of state variables is set with updated state variables as to the determined change of the at least one of the state variables. Additionally, the dynamic model is updated using the second set of state variables as the first set of state variables, in particular wherein the actual state of at least the part of the coordinate measuring machine is calculated based on at least the second set of state variables.

Therefore, in context with a particular embodiment of the invention, the actual state calculated from the second set of variables corresponds to a successive state of the CMM (according to a next time step), wherein the successive state is defined by the monitored changes of the state variables. Thus, a successive state as to the changes of the state variables is calculated as a new actual state of the CMM. Furthermore, in case no changes are determined (i.e. the second set of state variables corresponds to the first set), the calculated successive state basically corresponds to the previous state.

In contrast to just integrating acceleration signals as known from prior art (e.g. to derive velocity or position information) or by integrating velocity signals, with using the model and monitoring method according to the invention there are no random walk effects, which are prone to integrating acceleration sensors or velocity sensors. Furthermore, not only errors induced by controlled machine movements but also errors induced by machine environment (e.g. by additional machines operated in the same production hall) are enabled to be determined and compensated for.

According to a further embodiment of the invention the dynamic model is updated using the first set of state variables and the second set of state variables as the first set of state variables, wherein the actual state of at least the part of the coordinate measuring machine is calculated based on at least the first and the second set of state variables in the database.

More specific embodiments of the invention relate to deriving an actual deflection of at least the part of the coordinate measuring machine based on the model and/or to deriving an actual position of a designated point of the coordinate measuring machine based on the model and/or to compensating measuring errors based on the model.

Preferably, the above invention is adapted to calculate deflections of at least a part of a coordinate measuring machine and, thus, particularly providing correction values for the CMM. According to above specific embodiments, calculating the absolute position of a machine part or of a designated point at the machine (including deflections and/or correction values) is provided.

According to a particular embodiment of the invention the monitoring of the state variables, in particular the determining of the change of at least one of the state variables, is performed by measuring at least one of the physical properties and therefrom deriving at least one corresponding actual state variable and/or deriving an actual value for at least one of the state variables by a model based calculation, in particular estimation, and/or setting at least one of the state variables using a designated adjusting value.

Particularly, the change of at least one of the state variables is caused by a change of at least one of the physical properties, particularly caused by a movement of at least a part of the machine structure and/or of the probe head or by an external force affecting the coordinate measuring machine. For instance, the probe head is moved with relative high speed and touches a non-defined structure within the measuring space. As a consequence of this touching quite large bending forced are applied at the probe head or the probe, respectively, and cause a change of a measured deflection value.

In context of monitoring of at least one of the state variables, it is to be understood that at least a measuring of the physical properties and deriving corresponding state variables therefrom or a deriving of values for state variables directly from a model based estimation or a usage of adjusting values is performed. Thus, the monitoring step and particularly the monitored change of the at least one variable defines an observation, which is used to adjust the model according to a new corresponding system state.

Moreover, according to a further embodiment of the invention, the state variables define at least one or a combination of the following values and/or a change of the respective value of at least the part of the coordinate measuring machine:
acceleration (linear and/or rotational),
velocity (linear and/or rotational),
position (linear and/or rotational),
bending,
deformation,
displacement (linear and/or rotational),
orientation,
temperature,
humidity,
torque and/or
force.

Moreover, according to a further embodiment of the invention, the change of at least one of the state variables is derived by at least one of the following physical properties and/or by a change of the respective physical properties of at least the part of the coordinate measuring machine (1,2), in particular by measuring at least one of the physical properties:
acceleration (linear and/or rotational),
velocity (linear and/or rotational),
position (linear and/or rotational),
deflection,
torque and/or
force.

Thus, a change of the state variables can be caused by at least one of the physical properties.

Concerning a specific embodiment of the invention, at least one of the state variables is derived by measuring an excitation and/or an impact on the coordinate measuring machine with a sensor and/or by calculation from a path trajectory, in particular wherein at least one of the state variables is derived from determining the respective physical property.

Regarding this aspect, possible input values for the (compensation) model in order to provide parameters for calculation of an actual system state, acceleration, velocity, orientation, torque or force information or a combination of some of such inputs may be provided. Some input values might be determined by measurements and some input values might be calculated from a path-planner trajectory. Furthermore, input values might indirectly be determined by measurement of a deflection.

A further aspect of the invention relates to calculating a settling time and generating a settling signal based on the model for compensation of a measurement performed with the coordinate measuring machine. The settling time represents a duration for maintaining a defined measuring position in order to achieve predefined measuring accuracy.

In particular, the settling signal is processed for controlling a repositioning and/or a maintaining of a defined position of the probe head relative to a measuring point or for generating an output signal, in particular a sound and/or a light signal, for providing information for an operator in order to manually measure with the predefined measuring accuracy.

Therefore, the dynamic model may be used to calculate a specific settling time required in order to achieve a defined accuracy during probing with the CMM. Moreover, the model may be used for optimization of trajectory limitations (e.g. regarding jerk or acceleration) in order to achieve defined accuracy during scanning movements. Thus, the use of the model and calculation according to the invention allows to optimize measurement speeds and to increase throughput without violating accuracy target.

According to a specific embodiment of the invention, physical properties are monitored, particularly measured, and the monitored physical properties are provided in the database and the actual state of at least the part of the coordinate measuring machine is calculated based on at least the second set of state variables and the monitored physical properties in the database.

Particularly, a change of time is monitored with the change of the state variables and time information is assigned to every set of state variables in the database. With such additional time information computing of historical model data can be further improved and differences concerning measuring or monitoring time intervals can be considered precisely with computation of an actual machine state.

Regarding further aspects of the invention, the state variables, and particularly the physical properties, are monitored with defined monitoring intervals, in particular with a monitoring frequency, and/or a third two or more sets of state variables according to successive changes of the monitored state variables are set depending on the changes and added to the database and the actual state of at least the part of the coordinate measuring machine is calculated based on at least the first, the second and the third or more sets of state variables in the database. A calculation of the actual state of the CMM (or of a part of it) can be based on a defined or varying number of sets of state variables (e.g. depending on accuracy requirements or on movement parameters) and, thus, a broader spectrum of historical system data can be considered for deriving the actual state more precisely and to describe e.g. vibration behaviour of the system.

According to the invention, regarding the model building, several modelling approaches can be chosen for providing a suitable model for the method.

According to a specific embodiment of the invention a modelling approach described in the European Patent Application No. EP 13153954.6, filed on 5 Feb. 2013, may be used to obtain a model with a small number of elements for e.g. a linear axis and to keep processing time quite low.

According to a further embodiment of the invention, a 2D-model of the relevant parts of the CMM is employed, which is possible if cross coupling between different modelled planes can be neglected. Independent modelling in e.g. XZ- and YZ-plane may be provided (for instance, the Z-ram of CMM without dominant probe and/or probe head is defined). Such 2D-model can be built analytically and, advantageously, least computing power is required by that.

According to further embodiments of the invention, a coupled 2D-model is defined, wherein limited cross coupling between different planes is possible. An independent modelling in XZ- and YZ-plane may be employed, wherein a coupling via the torsions in the XY-plane is defined. Exemplarily, the Z-ram with an articulated probe head may be modelled with that method. Still less computing power compared to full modelling in 3 dimensions is required by a coupled 2D-model and the model can be built analytically as well.

Furthermore, 3D-modelling is provided according to a specific embodiment of the invention, wherein the 3D-model may be preferred, if dominant cross coupling effects between the planes are to be represented. In that context, due to complexity, iterative and/or recursive Multi-Body-Algorithms from robotic applications, such as Featherstone or Newton-Euler, may be preferable. Particularly, to reduce computing requirements, a Featherstone algorithm would be advantageous.

Regarding the solving of an implemented model, special care has to be taken on the integration during time steps in order to minimize the required calculation power to calculate one time step.

As the 2D-modelling (and coupled 2D-modelling) are most likely done analytically, the integration of such models may be done by looping through the following steps for each (or several) discrete time step:

Generate a continuous-time nonlinear state-space representation by:

$$\dot{x}(t) = A_C[x(t)] \cdot x(t) + B_C[x(t)] \cdot u(t);$$

$$y(t) = C_C[x(t)] \cdot x(t) + D_C[x(t)] \cdot u(t);$$

$$A_C(x(t)) = \begin{bmatrix} a_{C_{11}}(x(t)) & \cdots & a_{C_{1l}}(x(t)) \\ \vdots & \ddots & \vdots \\ a_{C_{l1}}(x(t)) & \cdots & a_{C_{ll}}(x(t)) \end{bmatrix};$$

$$B_C(x(t)) = \begin{bmatrix} b_{C_{11}}(x(t)) & \cdots & b_{C_{1m}}(x(t)) \\ \vdots & \ddots & \vdots \\ b_{C_{l1}}(x(t)) & \cdots & b_{C_{lm}}(x(t)) \end{bmatrix};$$

$$C_C(x(t)) = \begin{bmatrix} c_{C_{11}}(x(t)) & \cdots & c_{C_{1l}}(x(t)) \\ \vdots & \ddots & \vdots \\ c_{C_{n1}}(x(t)) & \cdots & c_{C_{nl}}(x(t)) \end{bmatrix};$$

$$D_C(x(t)) = \begin{bmatrix} d_{C_{11}}(x(t)) & \cdots & d_{C_{1m}}(x(t)) \\ \vdots & \ddots & \vdots \\ d_{C_{n1}}(x(t)) & \cdots & d_{C_{nm}}(x(t)) \end{bmatrix}$$

and $$x(t) = \begin{bmatrix} x_1(t) \\ \vdots \\ x_l(t) \end{bmatrix}; y(t) = \begin{bmatrix} y_1(t) \\ \vdots \\ y_n(t) \end{bmatrix}; u(t) = \begin{bmatrix} u_1(t) \\ \vdots \\ u_m(t) \end{bmatrix}.$$

Calculate the numerical values of the matrix-elements at a current time step.

Integration by transferring the numerical continuous-time state-space system into the discrete-time state-space representation by:

$$x_{k+1} = A_{D_k} \cdot x_k + B_{D_k} \cdot u_k \text{ and}$$

$$y_{k+1} = C_{D_k} \cdot x_k + D_{D_k} \cdot u_k,$$

wherein $C_{Dk}=C_C(k \cdot T)$, $D_{Dk}=D_C(k \cdot T)$, $x_i$ represent state variables according to a calculation step and $y_i$ represent an model output (machine state).

Alternatively, one of the following approaches may be chosen in context with the present invention:

$$x_{k+1}=A^*x_k+B^*u_k; y_k=C^*x_k+D^*u_k \text{ or}$$

$$x_{k+1}=A^*x_k+B^*u_{k-1}; y_k=C^*x_k+D^*u_{k-1} \text{ or}$$

$$x_{k+1}=A^*x_k+B^*u_k; y_k=C^*x_k+D^*u_{k-1}.$$

The transformation of the A and B matrices into discrete time may be calculated—according to the invention—by one of the following methods or by other suitable algorithms exemplarily executable with "Matlab" software:

ZOH-Equivalent:

$$A_{Dk} = e^{A_C(k \cdot T) \cdot T}; B_{Dk} = \int_0^T e^{A_C(kT)\rho} \cdot B_C \cdot d\rho$$

with a sample time T;

Simplified solution of the ZOH-Equivalent:

$$A_{Dk}=e^{A_C(k \cdot T) \cdot T}; B_{Dk}=e^{B_C(k \cdot T) \cdot T};$$

Tustin's approximation;

Taylor approximation of the ZOH-Equivalent:

$$A_{Dk} = I + A \cdot T \cdot \Psi; B_{Dk} = \Psi \cdot T \cdot B$$

where $$\Psi = I + \frac{A \cdot T}{2!} + \frac{A^2 \cdot T^2}{3!} + \ldots;$$

wherein an advantage of this Taylor approximation of the ZOH-Equivalent is the possibility to optimize the required computation power by reducing the accuracy requirements; and/or Padé-approximant.

Updating the state-values by execution of the discrete-time state-space representation.

The transformation into discrete time provides a more stable integration method with reduced integration steps, and thus, reduced calculation requirements.

As mentioned above, 3D-modelling may be done by a recursive/iterative rigid body algorithm such as Featherstone. There, the equations for each time-step can also be written in a matrix representation. Similarly to the state-space algorithm, the integration employs the calculation of a matrix exponent $e^{A \cdot T}$. Particularly, this calculation is approximated by either a Taylor approximation or a Padé-approximant.

Model building and solving at least regarding above outlined approaches is described in more detail in "Robotics—Modelling, Planning and Control", Bruno Siciliano, Lorenzo Sciavicco, Luigi Villani, Giuseppe Oriolo; Springer, $2^{nd}$ Printing, December 2008; in "Applied Dynamics—With Applications to Multibody and Mechatronic Systems", Francis C. Moon; Wiley-VCH, $1^{st}$ edition, June 1998; and in "Rigid Body Dynamics Algorithms", R. Featherstone; Springer, $1^{st}$ edition, December 2007.

The invention also relates to a coordinate measuring machine comprising a base, a probe head, a machine structure with structural components for linking the probe head to the base, at least one drive mechanism for providing movability of the probe head relative to the base and a controlling and processing unit adapted for execution of a modelling functionality. On execution of the modelling functionality a dynamic model with a first set of state variables is defined, the state variables being related to a set of physical properties of at least a part of the coordinate measuring machine and representing an actual state of at least the part of the coordinate measuring machine, the first set of state variables is provided in a database and the actual state of at least the part of the coordinate measuring machine is derived by a calculation based on the dynamic model.

According to the invention, furthermore, on execution of the modelling functionality at least one of the state variables of the first set of state variables is monitored and, based thereon, a change of at least one of the state variables is determined. Additionally, a second set of state variables with updated state variables as to the determined change of the at least one of the state variables is set and the dynamic model is updated using the second set of state variables as the first set of state variables, in particular wherein the actual state of at least the part of the coordinate measuring machine is calculated based on at least the second set of state variables.

Particularly, the controlling and processing unit of the coordinate measuring machine is adapted for execution of a method according to the invention as outlined above.

A specific embodiment according to the invention relates to the coordinate measuring machine comprising a sensor for monitoring the physical properties, in particular for measuring an excitation and/or an impact at the coordinate measuring machine, in particular an acceleration sensor and/or a deflection sensor and/or a vibration pick-up. The signals produced by such sensor are provided to the CMM (to the controlling and processing unit) and processed in order to derive an actual measuring value for at least one state variable.

Moreover, the invention relates to a computer programme product having computer-executable instructions for performing the method according to the invention, in particular when run on a controlling and processing unit of a coordinate measuring machine according to the invention.

BRIEF DESCRIPTION OF THE DRAWINGS

The method and the device according to the invention are described or explained in more detail below, purely by way of example, with reference to working examples shown schematically in the drawings. Specifically.

DETAILED DESCRIPTION

Figure 1:
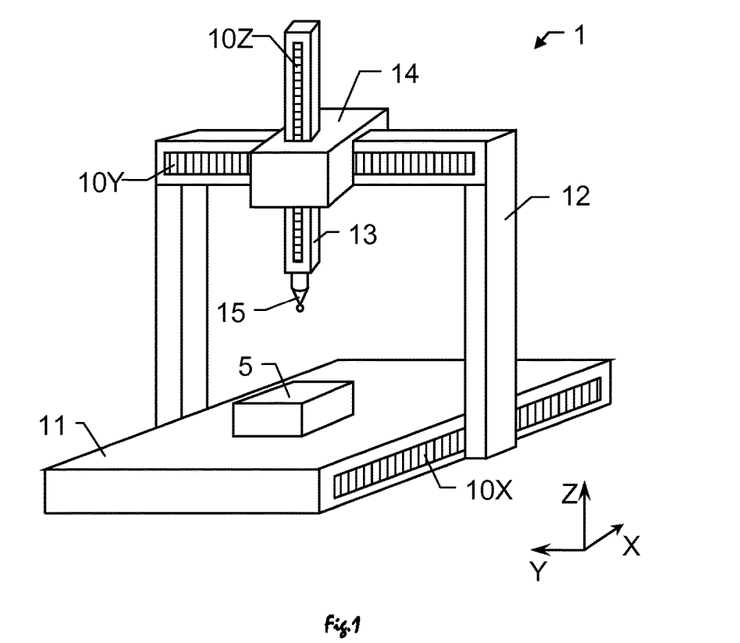
FIG. 1 shows a first exemplary embodiment of a coordinate measuring machine according to the invention.

In FIG. 1 an exemplary embodiment of a portal coordinate measuring machine 1 (CMM) according to the invention is depicted, the coordinate measuring machine 1 comprises a base 11 and a frame structure for linking a probe head 15 to the base 11, the frame structure comprising several frame components 12,13,14 being movable with respect to another. The first frame component 12 is a portal having two portal legs, which are connected by a bridging portion at their upper ends. Driven by a drive mechanism (not shown), the frame component 12 is capable to move along the longitudinal sides of the base 11. This direction corresponds to a first direction X. The movement of the frame component 12 particularly is performed by a gear rack attached to the base 11, which is meshing with a pinion on the frame component 12.

A carriage 14 is movably arranged on the bridging portion of the frame component 12. The movement of the carriage 14 (which is to bee seen as a further frame component) may also be achieved by a rack and pinion. A vertical rod 13 (sleeve, Z-ram), building a further frame component, is movably incorporated into the carriage 14. At the bottom portion of the vertical rod 13 a probe head 15 is provided.

The probe head 15 is movable to any desired point in a measuring volume (work zone) of the coordinate measuring machine 1 in the directions X, Y and Z. The measuring volume is defined by the base 11 and the frame components 12,13 and in particular by the range of movability of the carriage 14. The three space directions X, Y and Z are preferably orthogonal to one another, although this is not necessary for the present invention. It should be noted that a drive mechanism and a controller for driving the frame components and, thus, for driving the probe head 15 are not shown.

An object 5 to be measured is positioned in the space of the measuring volume on the base 11.

The probe head 15, on which a stylus is arranged exemplarily, is fastened on the lower free end of the rod 13. The stylus is used in a manner known per se for touching the object 5 to be measured. However, the present invention is not restricted to a tactile coordinate measuring machine and may likewise be used for coordinate measuring machines in which a measurement point is approached in a non-contact manner, i.e. for example a coordinate measuring machine with an optical scanning head. More generally, the probe head 15 may be designed for arranging a contact probe, e.g. a scanning or touch trigger probe, or a non-contact probe, particularly an optical, capacitance or inductance probe, or an articulated probe.

Two of the most common types of bearings between the movable members and the guides are air bearings or ball bearings (e.g. linear circulating plus rails). The air bearings give the advantage that there is no friction in the movement (which may introduce different kind of errors like angle errors or hysteresis). The disadvantage of air bearings is that the stiffness is lower than in ball bearings, so that particularly dynamic errors may occur. In ball bearing types, the stiffness in the bearing system is typically higher but there is friction and the friction forces may introduce errors. However, the invention may be applied for both types of bearings.

Summed up, the coordinate measuring machine 1 is built for determination of three space coordinates of a measurement point on an object 5 to be measured and, therefore, comprises three linear drive mechanisms for provision of movability of the probe head 15 relative to the base 11 in the first, second and third direction (X, Y and Z direction) and particularly machine components providing additional rotatory degrees of freedom (e.g. articulated probe).

Each linear drive mechanism has a linear guide, one in the first, one in the second and one in the third direction (X, Y and Z direction), respectively. In a simple embodiment, the linear guide of the X-direction drive mechanism is formed by two edge-building surfaces of the base 11, the linear guide of the Y-direction drive mechanism is formed by two or three surfaces of the bridge and the linear guide of the Z-direction drive mechanism is formed by a cubical hole in the Y-carriage member.

Furthermore, each linear drive mechanism comprises a movable member being supported for movement along the guide by bearings. In particular, the movable member of the X-direction drive mechanism is embodied as X-carriage having mutually facing surfaces with respect to the above mentioned two or three guiding surfaces of the base 11. The movable member of the Y-direction drive mechanism is embodied as Y-carriage 14 having mutually facing surfaces with respect to the above mentioned two or three guiding surfaces of the bridge. And, the movable member of the Z-direction drive mechanism is formed by Z-column 13 (sleeve) having mutually facing surfaces with respect to the inner surfaces of the cubical hole in the Y-carriage.

Moreover, each linear drive mechanism comprises a linear measuring instrument for determination of a first, a second or a third drive position, respectively, of each movable member in the first, the second or the third direction (X, Y and Z direction), respectively.

In this exemplary embodiment of FIG. 1, the portal legs each have a movable X-carriage which allows movement of the first frame component 12 in X-direction.

A measuring scale 10X being part of the X-measuring instrument is schematically represented on the long side of the base 11, wherein the scale 10X extends parallel to the X-direction. The scale may be a glass measuring scale, e.g. having incremental or absolute coding, with which a drive position in the X-direction of the X-carriage can be determined. It is to be understood that the measuring instrument may furthermore contain suitable sensors for reading the measuring scale 10X, although for the sake of simplicity these are not represented here. However, it should be pointed out that the invention is not restricted to the use of glass measuring scales, and therefore may also be used with other measuring instruments for recording the drive/travelling-positions of the movable members of the drive mechanisms.

Another measuring scale 10Y is arranged parallel to the Y-direction on the bridging portion of the first frame component 12. Finally, another measuring scale 10Z is also arranged parallel to the Z-direction on the Z-ram 14. By means of the measuring scales 10Y,10Z as part of the linear measuring instruments, it is possible to record the present drive positions of the second frame member 14 in Y-direction and of the sleeve 13 in the Z-direction meteorologically in a manner which is known per se.

In the shown embodiment, the base 11 comprises a table with a granite surface plate for supporting the object 5 to be measured, on which the space coordinates of the measurement point are intended to be determined.

Not shown is a controlling and processing unit, which is designed to actuate the motor drives of the coordinate measuring machine 1 so that the probe head 15 travels to the measurement point. The controlling and processing unit comprises a processor and a memory. In particular, the controlling and processing unit is designed for determining the three space-coordinates of the measurement point on the object 5 as a function of at least the first, the second and the third drive position of the three drive mechanisms.

For manual operation, the control unit may be connected to a user console. It is also possible for the control unit to fully automatically approach and measure measurement points of the object 5 to be measured.

Because the design of coordinate measuring machines of the generic kind as well as the design of different linear guides and different linear measuring instruments are well known to skilled persons, it must be understood that numerous modifications and combinations of different features can be made. All of these modifications lie within the scope of the invention.

Thus, the invention may generally be used with all types of coordinate measuring machines, i.e. with a CMM being designed as parallel kinematics machine as well as with a CMM having linear or serial kinematics. Exemplarily, the CMM may be designed as bridge-type, L-bridge-type, horizontal-arm-type, cantilever-type or gantry-type machine or may be designed as articulated arm. Furthermore, a CMM in context with the present invention also is to be understood as a system for precise positioning and/or precise assembling of work pieces or tools and/or for applying materials, e.g. spraying or printing of paint or other materials. Such a system is designed to provide movement and measurement of positions within a working volume defined by the structure of the respective system and defines a coordinate system, within which positioning of system components with high precision is provided. In particular, such a system provides carrying and placing of a work piece or a tool relative to a further work piece with high accuracy. For instance, a robot providing precise positioning and/or measuring abilities may be operated and controlled based on execution of the dynamic model according to the invention.

Moreover, according to the invention, the controlling and processing unit comprises a functionality for dynamical—in particular continuously—calculating deflections of the coordinate measuring machine 1 on basis of a model which represents physical parameters of (at least a part of) the CMM 1. For such dynamic calculation an excitation of the CMM 1 and/or an external impact on the CMM 1 is monitored (e.g. by measuring physical properties or by calculation of the parameter) and system variables are updated according to the monitoring. That process of monitoring and updating the parameters is performed in defined time intervals. Thus, a change of respective system parameters and relating physical properties (i.e. the value of a physical property) is determined and additionally stored in a database and a calculation of the deflections can be performed based on that model with values from the database. By considering the history of several physical parameters, which are set for representing at least the part of the CMM 1 by the model over time, a real dynamic calculation of occurring deformations and/or vibrations at the CMM 1 can be done and errors caused by that deflections can be compensated for. Natural frequencies are enabled to be calculated and their influences can be corrected as well.

Therefore, defining a model and performing monitoring of physical parameters and calculating an actual state of a CMM 1 according to the invention allow reduction of errors due to the dynamic behaviour of the CMM 1. Above described functionality provides an improved and precise basis for dynamically modelling machine parameters and for calculating and, particularly, correcting or compensating for deflections, i.e. for dynamically changing deflections.

Figure 2:
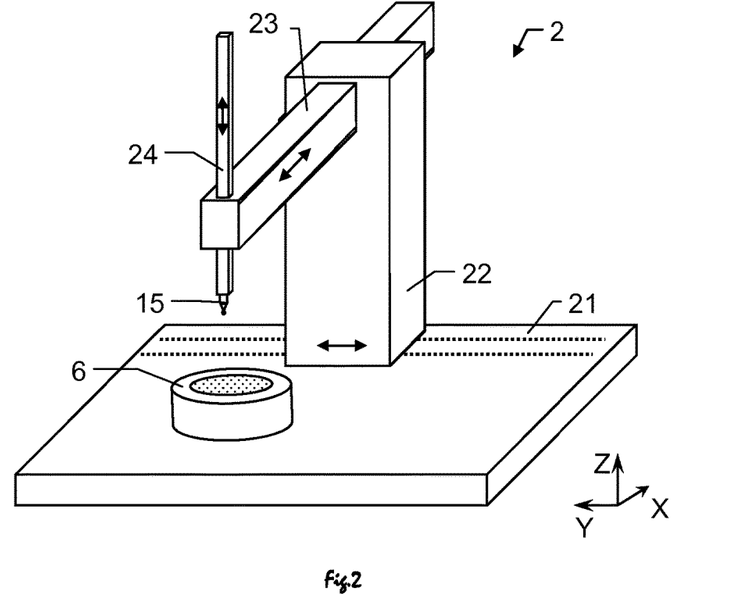
FIG. 2 shows a second exemplary embodiment of a coordinate measuring machine according to the invention.

FIG. 2 shows a second exemplary embodiment of a coordinate measuring machine 2 (CMM) according to the invention, wherein the coordinate measuring machine 2 comprises a base 21 and components 22,23,24 for providing movability of the probe head 15 in three directions (X-, Y- and Z-direction) relative to the base 21. For this reason, the components 22,23,24 are moveable relative to each other by drive mechanisms (not shown) linking the three components 22,23,24 and the base 21.

An object 6 to be measured is placed on the base 21. For measuring this object 6 the probe head 15 is approached to the surface of the object 6. Coordinates are determined according to a predefined measuring path on which a tactile measuring sensor at the probe head 15 is guided and the surface profile of the object is determined depending on that measurement.

The machine 2 further comprises a memory unit on which object data is stored. After deriving surface data for the object 6 by measurement, this data is compared to the object data stored in the memory unit and possible variations in the surface are identified on basis of comparing the data.

According to the invention, a model providing actual state information regarding position and/or deflection of the CMM 2 (or of at least a part of the CMM 2) is defined. The model is set on basis of state variables each of which representing a physical property of the part of the CMM 2 and the state variables are stored in a data storage device, particularly a set of state variables represents a set of physical properties. An actual state for the part of the CMM 2 (i.e. a position of a structural component and/or a deflection of said component) can be derived by calculations based on that model. Additionally, the physical properties are monitored and, thus, a change of at least one of these properties is determined. Such monitoring may be performed by attaching a specific sensor at the CMM 2 and tracking signals produced by the sensor or by deriving a change of a physical property from a model describing interactions of a number of such physical properties.

A new, updated set of state variables is defined based on the monitoring after a predefined time interval, wherein the new set may comprise values of the monitored physical properties being equal to the values of the preceding set of variables and may comprise values differing from the values according to the preceding set. E.g. the velocity of a frame component remains constant but a bending (which e.g. is measured with a strain gauge) decreases over a monitored time period. Therefore, at least two (particularly more) sets of state variables are provided each representing a state of the CMM at a defined point in time.

By calculating a new actual state of the coordinate measuring machine 2 from the new set (and particularly from the preceding set or from more preceding sets of state variables) the monitored change of the variables (i.e. of the physical properties) is considered and the actual state is derivable from the model with these several sets of variables. This means—in other words—a historical development of the state variables is considered for calculation of an actual system state (by updating the set of variables).

With such method a temporal change of physical parameters of the CMM 2 and of the variables of the model representing the CMM 2 can be tracked and based on that change and on calculation based on that change a real dynamical description of the behaviour of the modelled CMM part is enabled. Therefore, for instance bending, displacement, torsion and/or vibration of at least one part of the CMM 2 can be derived on basis of the model. In addition, corresponding errors may be determined from the model and the errors may be corrected by charging derived error values against actual measured position values.

Figure 3:
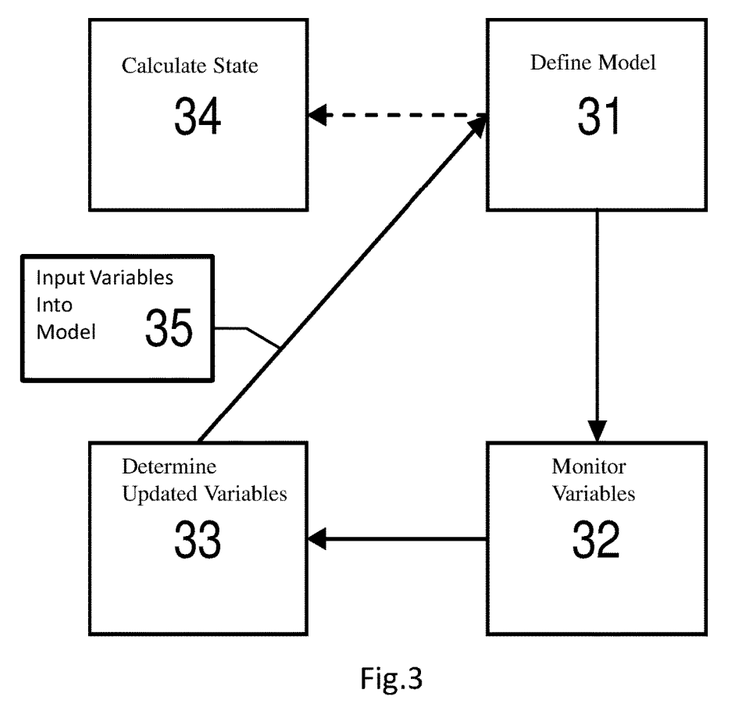
FIG. 3 a block diagram illustrating the general principle of the model and calculation according to a particular embodiment of the invention.

FIG. 3 shows a block diagram illustrating a general principle of the model and calculation according to a preferred embodiment of the invention.

In a first step 31 a model representing at least one part of a coordinate measuring machine is defined. That model comprises several system variables which represent specific physical parameters of the part of the CMM. With the first step 31, the variables may be set with defined values in order to model an initial model state of the at least one part of the CMM, in particular of the whole CMM, and defining that initial model state and relating variable values as a starting point. Based on that initial model state a corresponding machine state may be calculated 34 representing an initial real state of the part of the CMM. Particularly, in assumption that the machine components are positioned in defined locations and are not moving relative to each other, such initial states can be defined and calculated in very precise and exact manner.

According to the invention, the defined system variables are monitored 32. For providing monitoring, some or all of the system variables or physical parameters, respectively, are measured directly on the CMM via a sensor being specified for measuring a change of a physical value corresponding to the respective variable. E.g. an acceleration sensor determines a change of velocity and/or acceleration on a machine part or a temperature sensor provides an actual machine temperature. Additionally or alternatively, some or all values for the system variables are (continuously) derived from further calculations or predictions based on further models or on the model according to the invention.

The values provided by the monitoring/measuring procedure are fed into the model, i.e. a new set of updated variables 33 is determined and may be provided in a database. Such database may be located at the CMM or may be located away from the CMM, e.g. at an external server unit providing the data. In that context, the data may be transferred to a cloud-computing unit and/or may be processed at the computing unit. In particular, time information is allocated to the set of variables and/or to each value in order to indicate a temporal difference between successive variable-values. By such definition of an updated set of variables and particularly by considering the time line of the sets of variables, a new basis for calculation an actual state of at least the part of the CMM is provided. With other words—the updated set of variables is derived based on the monitoring of the physical properties of the CMM and the system variables of the model are replaced by the updated variables. According to a specific embodiment of the invention, the updated set of variables is added to the database as a second, additional set of variables and both or only one of those sets are processed for deriving a state of the CMM.

The at least one set of variables is input 35 into the general model 31 in order to update the model for providing a new base for starting calculations.

Thus, in a further step a new (actual) state (=successive state) of at least the part of the CMM or of the whole CMM is calculated 34 referring to the lastly derived set of variables and particularly to the at least one or more set of variables defined before and/or physical parameters derived by measurements or calculations. With such calculation over one or several sets of variables, which are derived from the monitoring of the defined system variables at different points in time (i.e. the deviation or change of at least one variable and/or the respective physical property is determined and considered with the calculation), a new actual state of the CMM (or part of the CMM, respectively) is derived, wherein dynamic effects occurring and propagating in time regarding at least the part of the CMM are represented by the calculated state. Respectively, such calculated state of the part of the CMM represents e.g. an actual deflection (e.g. caused by vibrations) of the part.

The tracking of changes of physical quantities allows dynamical computing of e.g. the generation and propagation of vibrations in machine components and, based thereon, the determination of a measuring error and compensation of that error.

FIGS. 4a-d exemplarily illustrate a change of one system variable (acceleration in X-direction) over time and a displacement development caused by that change with respect to reality and to model-based calculations.

Figure 4A:
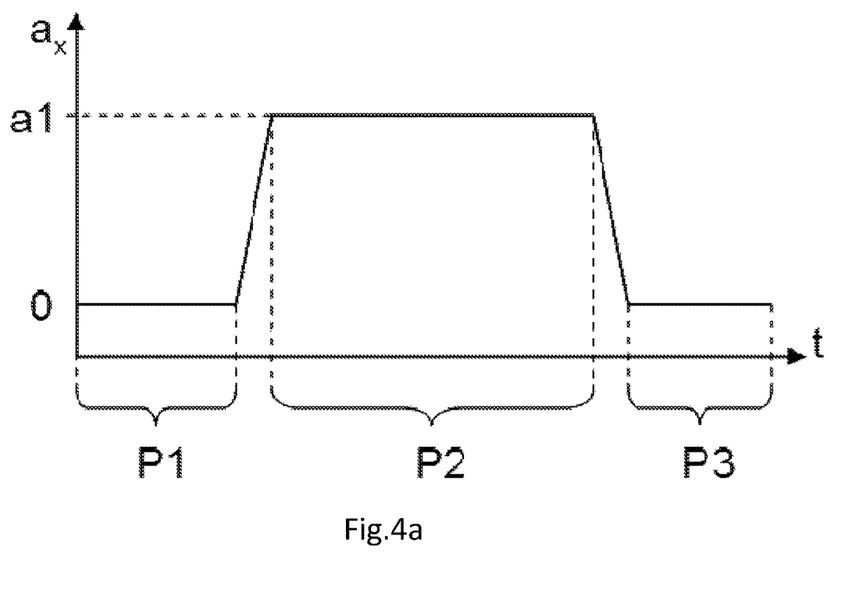
FIG. 4a-d exemplarily illustrate a change of one system variable over time and a displacement development caused by that change with respect to reality and to model-based calculations, in particular to a model-based calculation according to the invention.

FIG. 4a shows a chart representing an (induced) acceleration $a_x$ of a first point (e.g. readout head mounted on a first frame component for measuring X-position on measuring scale) of a structural component of a CMM in X-direction over time t. For a first time period P1 the point is not accelerated (acceleration $a_x=0$) and e.g. moves with constant velocity in X-direction. After that period P1 the point is positively accelerated until reaching a predefined acceleration value a1, which is kept for a second time period P2. Then the point is decelerated (slowed down) until reaching again the acceleration value 0, wherein that state of not accelerating the point is maintained for a third time period P3.

Figure 4B:
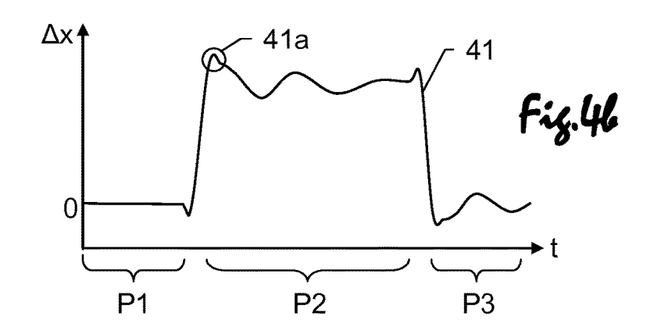

FIG. 4b depicts the real displacement and/or deformation behaviour in X-direction Δx of a second designated point (e.g. x-direction displacement/deformation of a probe head relative to the first frame component) of the CMM as to an actuation according to FIG. 4a. The real displacement and/or deformation Δx over time is shown by line 41. Line 41 represents the displacement behaviour of the second designated point basically as it occurs in reality when changing the acceleration of the first point as shown. In that context it has to be noted that typically the location of the point where the acceleration is induced (first point) differs from the location of the point at which the actual displacement (e.g. caused by the acceleration) is determined (second designated point). As can be seen from line 41, when changing the acceleration value the displacement in X-direction does not change in correspondence but differs from a linear increase of acceleration by vibrations occurring with the position in X-direction. Moreover, additional non-linear peaks may occur according to the acceleration as depicted by 41a.

Such non-linear and dynamical behaviour of a structural component of the CMM occurs e.g. from excitation of natural frequencies of machine components, the excited vibrations of which propagate throughout several components of the CMM when a first frame component is moved relative to a second frame component with use of the linear drive mechanism (e.g. as the vibration of the drive is transferred to other machine parts). Thus, vibrations within specific machine parts can be amplified and/or can superimpose and/or can influence other machine parts as well, which may lead to quite complex vibration behaviour of single or a group of machine components.

Figure 4C:
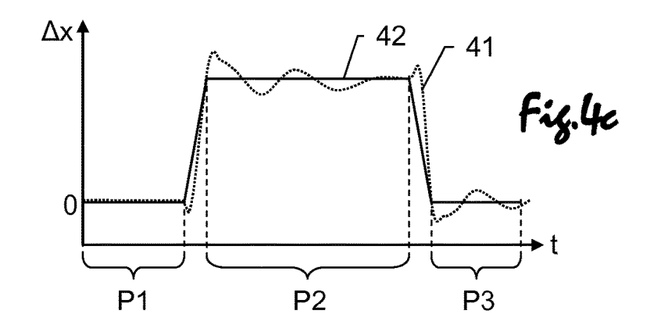

FIG. 4c shows a calculated displacement of the second designated point in X-direction Δx according to a model known from prior art, wherein the calculation is based on an excitation (change of acceleration) of the CMM according to FIG. 4a. As can be seen by comparing the dotted line 42, which represents the derived displacement Δx over time from the known model, with the real development of the variations of the X-position (of a designated point, cf. FIG. 4b), the calculation of the displacement Δx does not describe the real vibration behaviour of the structure (designated point) but approximates the X-displacement in quite rough manner. The deformation is calculated as an equilibrium position and does not include effects due to dynamic deformations. Such a calculation and a corresponding model are e.g. described in above referenced EP 1 687 589.

Figure 4D:
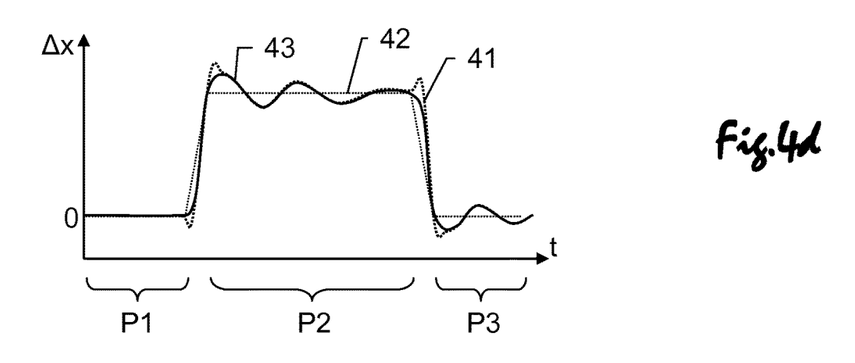

FIG. 4d illustrates a calculation of X-displacement Δx of the second designated point according to the invention. A dynamic model as described above is applied for the respective part of the CMM (or for the whole CMM) to calculate the deflection, i.e. the displacement Δx of the designated point. Internal system variables and their deviation are employed in order to precisely calculate the deflection and the time history of an excitation (here: change of acceleration) and state variables are used to calculate the deformations. Line 43 shows the calculated result for displacements over time.

By such dynamic modelling and calculating from the model a more precise result concerning the displacements Δx is obtained, which basically represents the behaviour of the structure (i.e. the designated point) in a real manner. Still some runaway values 41a of the real displacements Δx according to FIG. 4b may occur which are not represented by the calculation according to the invention, but as these effects are of minor influence on the overall displacement calculation, they are negligible.

The deflection values calculated like this may be used to correct a measured probe position value (e.g. a measured position of a measuring point on an object to be measured) and, thus, to reduce errors due to a dynamic behaviour of the CMM. The errors may be corrected due to both static and dynamic effects (including natural frequencies), wherein some (but in particular not all) system variables and/or physical parameters (e.g. acceleration) are measured.

Therefore, a dynamic monitoring and calculation according to the invention enables to precisely derive actual vibration states of a CMM and provides to compensate for errors caused by machine vibrations.

Although the invention is illustrated above, partly with reference to some specific embodiments, it must be understood that numerous modifications and combinations of different features of the embodiments can be made and that the different features can be combined with modelling and calculation principles and/or coordinate measuring machines known from prior art.

What is claimed is:
1. A method for providing dynamic state information for at least a part of a coordinate measuring machine that includes a base, a probe head, a machine structure with structural components for linking the probe head to the base, and at least one drive mechanism for providing movability of the probe head relative to the base, wherein the following steps are carried out for execution of the method:
 defining a dynamic model with a first set of state variables that are related to a set of physical properties of at least the part of the coordinate measuring machine and represent an actual state of at least the part of the coordinate measuring machine;
 providing the first set of state variables in a database;
 deriving the actual state of at least the part of the coordinate measuring machine by a calculation based on the dynamic model;
 monitoring at least one of the state variables of the first set of state variables and, based thereon, determining a change of at least one of the state variables;

setting a second set of state variables with updated state variables as to the determined change of the at least one of the state variables;

updating the dynamic model using the second set of state variables in place of the first set of state variables; and in response to updating the dynamic model, calculating the actual state of at least the part of the coordinate measuring machine based on at least the second set of state variables.

2. The method according to claim 1, further comprising:

updating the dynamic model using the first set of state variables and the second set of state variables as the first set of state variables; and calculating the actual state of at least the part of the coordinate measuring machine based on at least the first and the second set of state variables.

3. The method according to claim 1, wherein:

deriving the actual state of at least the part of the coordinate measuring machine by the calculation based on the dynamic model comprises deriving at least one of:

an actual deflection of at least the part of the coordinate measuring machine; and an actual position of a designated point of the coordinate measuring machine.

4. The method according to claim 1, further comprising:

compensating for measuring errors based on the dynamic model.

5. The method according to claim 1, wherein:

determining of the change of at least one of the state variables, is performed by at least one of:

measuring at least one of the physical properties and, therefrom, deriving at least one corresponding actual state variable;

deriving an actual value for at least one of the state variables by a model based calculation; and setting at least one of the state variables using a designated adjusting value.

6. The method according to claim 1, wherein:

the change of at least one of the state variables is caused by at least one of:

a force resulting from a deformation of at least a part of the machine structure and/or of the probe head; and an external force affecting the coordinate measuring machine.

7. The method according to claim 1, wherein:

the state variables define at least one the following values and/or a change of the respective value of at least the part of the coordinate measuring machine:

acceleration;
velocity;
position;
bending;
deformation;
displacement;
orientation;
temperature;
humidity;
torque; and
force.

8. The method according to claim 1, wherein:

the change of at least one of the state variables is derived by at least one of the following physical properties and/or a change of the respective physical properties of at least the part of the coordinate measuring machine by measuring at least one of the physical properties:

acceleration;
velocity;
position;
deflection;
torque; and
force.

9. The method according to claim 1, wherein:

at least one of the state variables is derived by at least one of:

measuring an excitation and/or an impact on the coordinate measuring machine with a sensor; and calculation from a path trajectory, wherein at least one of the state variables is derived from determining the respective physical property.

10. The method according to claim 1, further comprising:

calculating a settling time and generating a settling signal based on the model for compensation of a measurement performed with the coordinate measuring machine, wherein the settling time represents a duration for maintaining a defined measuring position in order to achieve predefined measuring accuracy.

11. The method according to claim 10, wherein:

the settling signal is processed to perform at least one of:

controlling a repositioning and/or a maintaining of a defined position of the probe head relative to a measuring point; and generating an output signal to provide information for an operator in order to manually measure with the predefined measuring accuracy.

12. The method according to claim 1, further comprising:

measuring physical properties and providing the measured physical properties in the database and calculating the actual state of at least the part of the coordinate measuring machine based on at least the second set of state variables and the monitored physical properties in the database.

13. The method according to claim 1, further comprising:

monitoring a change of time with the change of the state variables and assigning a time information to every set of state variables in the database.

14. The method according to claim 1, wherein:

the state variables and the physical properties are monitored with defined monitoring intervals having a monitoring frequency.

15. The method according to claim 1, further comprising:

setting third or more sets of state variables according to successive changes of the monitored state variables depending on the changes; and adding said third or more sets of state variables to the database, wherein the actual state of at least the part of the coordinate measuring machine is calculated based on at least the first, the second and the third or more sets of state variables in the database.

16. A coordinate measuring machine comprising:

a base;
a probe head;
a machine structure with structural components for linking the probe head to the base;
at least one drive mechanism for providing movability of the probe head relative to the base; and
a controlling and processing unit adapted for execution of a modelling functionality, on execution of which:

a dynamic model with a first set of state variables is defined, the state variables being related to a set of physical properties of at least a part of the coordinate measuring machine and representing an actual state of at least a part of the coordinate measuring machine;

the first set of state variables is provided in a database;

the actual state of at least the part of the coordinate measuring machine is derived by a calculation based on the dynamic model;

at least one of the state variables of the first set of state variables is monitored and, based thereon, a change of at least one of the state variables is determined;

a second set of state variables with updated state variables as to the determined change of the at least one of the state variables is set; and the dynamic model is updated using the second set of state variables as the first set of state variables, wherein the actual state of at least the part of the coordinate measuring machine is calculated based on at least the second set of state variables.

17. The coordinate measuring machine according to claim 16, wherein:

the controlling and processing unit of the coordinate measuring machine is adapted for execution of a method according to the claim 1.

18. The coordinate measuring machine according to claim 16, further comprising:

a sensor for measuring excitation or impact at the coordinate measuring machine, the sensor including at least one of:

an acceleration sensor;

a deflection sensor; and a vibration pick-up.

19. The coordinate measuring machine according to claim 17, further comprising:

a sensor for measuring excitation or impact at the coordinate measuring machine, the sensor including at least one of:

an acceleration sensor;

a deflection sensor; and a vibration pick-up.

20. A computer program product having a non-transitory computer-readable medium carrying computer-executable instructions for performing the method of one of claim 1 executed on a controlling and processing unit of a coordinate measuring machine according to claim 16.

* * * * *